(No Model.)

W. H. SLEEPER.
CENTERING TRY SQUARE.

No. 265,287. Patented Oct. 3, 1882.

Witnesses.
S. N. Piper
E. B. Pratt

Inventor.
Walter H. Sleeper,
by R. H. Eddy atty.

N. PETERS. Photo-Lithographer, Washington, D. C.

UNITED STATES PATENT OFFICE.

WALTER H. SLEEPER, OF ATHOL, MASSACHUSETTS.

CENTERING TRY-SQUARE.

SPECIFICATION forming part of Letters Patent No. 265,287, dated October 3, 1882.

Application filed February 6, 1882. (No model.)

*To all whom it may concern:*

Be it known that I, WALTER H. SLEEPER, of Athol, of the county of Worcester and State of Massachusetts, have invented a new and useful Improvement in Centering Try-Squares; and I do hereby declare the same to be described in the following specification and represented in the accompanying drawings, of which—

Figure 1:
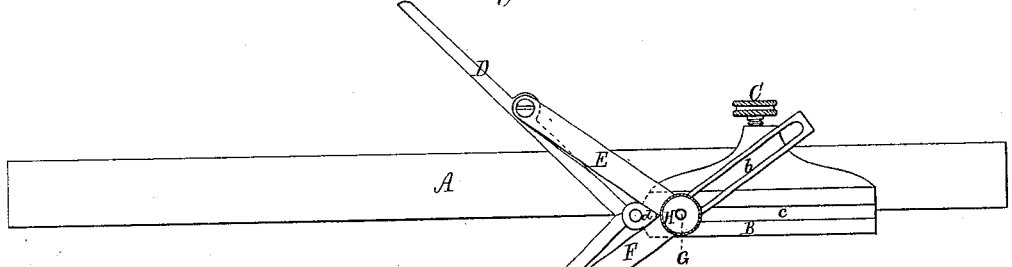
Figure 2:
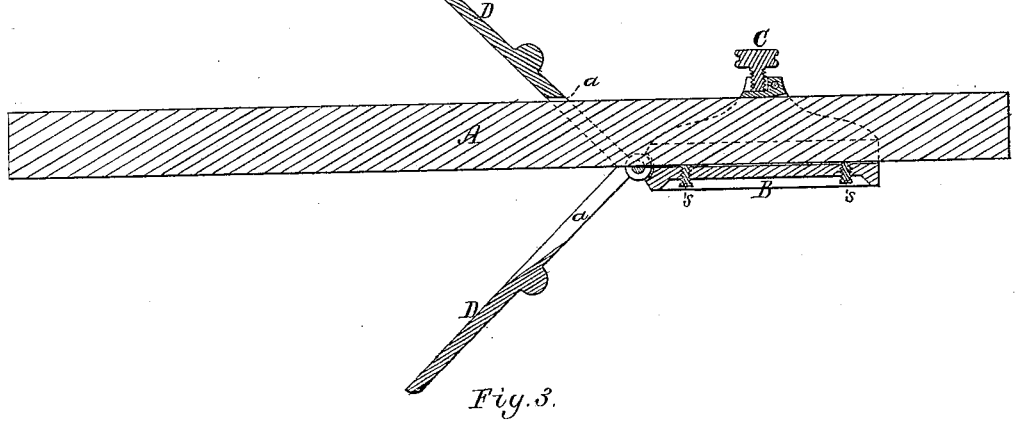
Figure 3:
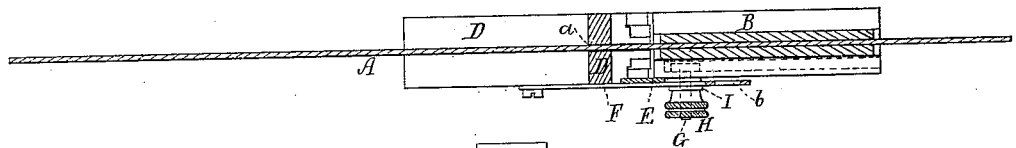
Figure 4:
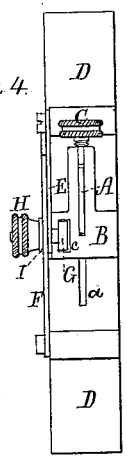

Figure 1 is a side elevation, Fig. 2 a longitudinal section, Fig. 3 a horizontal section, and Fig. 4 a front end view, of a try-square embracing my invention, the nature of which is defined in the claims hereinafter presented.

In this centering try-square the two gages are straight and flat bars, hinged by a rule-joint to the stock, and they are provided with means for supporting them in line with or at either a right, acute, or obtuse angle to each other, the centering rule or bar having one edge in the axis of the joint of the gages, and being adapted to slide rectilinearly in them, and the stock provided with a screw for clamping it to the said bar.

In the drawings, A denotes the centering rule or bar, and B the stock, the latter being grooved lengthwise of it to receive the said bar. The stock extends over the upper edge of the bar, and is provided in the extension with a screw, C, to act against such edge, in order to clamp the stock to the bar.

The two adjustable gages are shown at D D, each having in it, from its inner end toward its outer end, a long slot, $a$, to receive the bar A and allow the gage to be moved into different angular positions relatively thereto. The two gages are connected at their inner ends with the stock by a rule-joint, and they have pivoted to them two flat arms, E F, one of which—viz., F—is longer than the other, and is provided with a long slot, $b$, arranged in it, as represented.

A screw, G, having its head within a dovetailed groove, $c$, made lengthwise in the stock, extends through the arm E and the slot $b$ in the arm F, a clamp-nut, H, being screwed on the said screw and against a washer, I, encompassing the shank of the screw and resting on the slotted arm F.

Near the joint of the gages and stock the said stock has a shoulder or abutment, $d$, against which the arm E brings up when the two gages are at a right angle to each other, and each stands at an angle of forty-five degrees with the inner edge of the rule A.

By means of the arms and their clamp nut and screw and the groove in the stock the gages may be adjusted into a straight line or various angular positions with each other or with the rule or bar, and may be clamped in either of said positions, as circumstances may require in using the instrument, for obtaining centers of circular work or for determining or laying off angles or other purposes.

In the stock are two screws, $s$ $s$, which are screwed upward therein against the lower edge of the bar A, or they may screw against a short and straight strip of metal arranged loosely in the stock and directly underneath and against the bar, the object of such screws being to adjust the lower edge of the bar in the axis of the rule-joint and into an angle of forty-five degrees with such gage when the two gages are at a right angle to each other.

What I claim as my invention is as follows, viz:

1. The combination of the bar A and the stock B, adapted thereto, and provided with a clamp-screw, C, and dovetailed groove $c$, as set forth, with the two gages D and their supporting-arms E F, clamp-screw G, and nut H, all being constructed, arranged, and applied substantially as specified and represented.

2. The stock B, grooved as described, and provided with the abutment $d$, the two gages D, their supporting-arms E F, and clamping-screw G, and nut H, all arranged and applied substantially in manner and to operate with the rule A as specified.

3. The stock, grooved as described, and provided with the adjusting-screws $s$ $s$, arranged in it, as set forth, and with the two gages D, their supporting-arms E F, and clamping-screw G and nut H, all being applied substantially in manner and to operate with the rule A as specified.

WALTER H. SLEEPER.

Witnesses:
R. H. EDDY,
E. B. PRATT.